United States Patent
Wang et al.

(10) Patent No.: US 12,428,842 B2
(45) Date of Patent: *Sep. 30, 2025

(54) MULTI-LAYERED THERMOPLASTIC ROOFING MEMBRANES

(71) Applicant: Holcim Technology Ltd, Zug (CH)

(72) Inventors: Hao Wang, Carmel, IN (US); Donna C. Tippmann, Fishers, IN (US); Michael J. Hubbard, Goshen, IN (US)

(73) Assignee: Amrize Technology Switzerland LLC, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,472

(22) Filed: May 15, 2024

(65) Prior Publication Data

US 2024/0295125 A1 Sep. 5, 2024

Related U.S. Application Data

(63) Continuation of application No. 17/421,751, filed as application No. PCT/US2020/013529 on Jan. 14, 2020, now Pat. No. 11,987,986.

(Continued)

(51) Int. Cl.
| | |
|---|---|
| *E04D 5/10* | (2006.01) |
| *B32B 27/08* | (2006.01) |
| *B32B 27/12* | (2006.01) |
| *B32B 27/20* | (2006.01) |
| *B32B 27/32* | (2006.01) |
| *B32B 37/15* | (2006.01) |

(Continued)

(52) U.S. Cl.
CPC ............... *E04D 5/10* (2013.01); *B32B 27/08* (2013.01); *B32B 27/12* (2013.01); *B32B 27/20* (2013.01); *B32B 27/32* (2013.01); *B32B 37/153* (2013.01); *B32B 2250/05* (2013.01); *B32B 2250/242* (2013.01); *B32B 2250/40* (2013.01); *B32B 2307/308* (2013.01); *B32B 2307/732* (2013.01); *B32B 2419/06* (2013.01); *C08F 10/02* (2013.01); *C08K 3/346* (2013.01); *C08K 3/36* (2013.01)

(58) Field of Classification Search
None
See application file for complete search history.

(56) References Cited

U.S. PATENT DOCUMENTS

| | | |
|---|---|---|
| 4,141,187 A | 2/1979 | Graves |
| 4,957,968 A | 9/1990 | Adur et al. |

(Continued)

FOREIGN PATENT DOCUMENTS

| | | |
|---|---|---|
| CN | 101668808 A | 3/2010 |
| EP | 1245620 A2 | 10/2002 |

(Continued)

OTHER PUBLICATIONS

International Search Report and Written Opinion for Appl. No. PCT/US2014/069988 dated Mar. 5, 2015, p. 1-4.

(Continued)

*Primary Examiner* — Ramsey Zacharia
(74) *Attorney, Agent, or Firm* — Renner, Kenner; Arthur M. Reginelli

(57) ABSTRACT

A multi-layered membrane comprising skin layers including an ethylene-based olefinic block copolymer (EBOC); and two or more core layers including a propylene-based elastomer (PBE).

19 Claims, 1 Drawing Sheet

Related U.S. Application Data

(60) Provisional application No. 62/792,699, filed on Jan. 15, 2019, provisional application No. 62/792,299, filed on Jan. 14, 2019.

(51) Int. Cl.
  *C08F 10/02* (2006.01)
  *C08K 3/34* (2006.01)
  *C08K 3/36* (2006.01)

(56) References Cited

U.S. PATENT DOCUMENTS

| | | | |
|---|---|---|---|
| 5,437,923 A | 8/1995 | Kalkanoglu | |
| 5,573,092 A | 11/1996 | Gabilondo | |
| 5,586,414 A | 12/1996 | Tawzer | |
| 5,624,999 A | 4/1997 | Lombardi et al. | |
| 5,891,563 A | 4/1999 | Letts | |
| 5,927,258 A | 7/1999 | Clauss et al. | |
| 6,044,604 A | 4/2000 | Clayton et al. | |
| 6,117,375 A | 9/2000 | Garrett et al. | |
| 6,414,070 B1 | 7/2002 | Kausch et al. | |
| 6,503,984 B2 | 1/2003 | Johnson et al. | |
| 6,544,909 B1 | 4/2003 | Venkataswamy et al. | |
| 6,656,982 B2 | 12/2003 | Yasuda | |
| 6,720,067 B2 | 4/2004 | Takahashi et al. | |
| 6,927,258 B2 | 8/2005 | Datta et al. | |
| 7,355,089 B2 | 4/2008 | Chang et al. | |
| 7,387,753 B2 | 6/2008 | Tackett et al. | |
| 7,579,397 B2 | 8/2009 | Nelson | |
| 7,612,120 B2 | 11/2009 | Letts | |
| 7,666,491 B2 | 2/2010 | Yang | |
| 7,741,397 B2 | 6/2010 | Liang et al. | |
| 7,838,568 B2 | 11/2010 | Letts et al. | |
| 7,882,671 B2 | 2/2011 | Bruce et al. | |
| 7,893,166 B2 | 2/2011 | Shan et al. | |
| 7,964,672 B2 | 6/2011 | Ouhadi | |
| 8,440,284 B2 | 5/2013 | Kelly | |
| 9,045,904 B2 | 6/2015 | Hubbard et al. | |
| 9,434,827 B2 | 9/2016 | Frei et al. | |
| 11,987,986 B2 * | 5/2024 | Wang | B32B 7/12 |
| 2002/0013379 A1 | 1/2002 | Singh et al. | |
| 2002/0049266 A1 | 4/2002 | Yasuda | |
| 2003/0032351 A1 | 2/2003 | Horner | |
| 2003/0060557 A1 | 3/2003 | Tasaka et al. | |
| 2003/0082365 A1 | 5/2003 | Geary et al. | |
| 2003/0153656 A1 | 8/2003 | Sjerps | |
| 2003/0198813 A1 | 10/2003 | Howell | |
| 2004/0033741 A1 | 2/2004 | Peng | |
| 2004/0109983 A1 | 6/2004 | Rotter et al. | |
| 2004/0146681 A1 | 7/2004 | Naipawer, III et al. | |
| 2004/0198912 A1 | 10/2004 | Dharmarajan et al. | |
| 2004/0248751 A1 | 12/2004 | Johnson et al. | |
| 2005/0183365 A1 | 8/2005 | Naipawer, III et al. | |
| 2006/0046084 A1 | 3/2006 | Yang et al. | |
| 2006/0127664 A1 | 6/2006 | Geary et al. | |
| 2006/0179749 A1 | 8/2006 | Brandt et al. | |
| 2006/0199930 A1 | 9/2006 | Li et al. | |
| 2007/0193167 A1 | 8/2007 | Bruce et al. | |
| 2007/0194482 A1 | 8/2007 | Douglas et al. | |
| 2007/0277450 A1 | 12/2007 | Raulie | |
| 2008/0179574 A1 | 7/2008 | Yang et al. | |
| 2008/0206583 A1 | 8/2008 | Phan et al. | |
| 2009/0049802 A1 | 2/2009 | Johnson et al. | |
| 2009/0137168 A1 | 5/2009 | Peng | |
| 2009/0181216 A1 | 7/2009 | Peng | |
| 2009/0255573 A1 | 10/2009 | Taylor | |
| 2009/0269565 A1 | 10/2009 | Peng | |
| 2009/0275690 A1 | 11/2009 | Weaver et al. | |
| 2010/0029827 A1 | 2/2010 | Ansems et al. | |
| 2010/0084158 A1 | 4/2010 | Gau et al. | |
| 2010/0125114 A1 | 5/2010 | Williams et al. | |
| 2010/0197844 A1 | 8/2010 | Yang et al. | |
| 2011/0003094 A1 | 1/2011 | Becker | |
| 2011/0118404 A1 | 5/2011 | Jung et al. | |
| 2011/0139340 A1 | 6/2011 | Naipawer, III et al. | |
| 2011/0206973 A1 | 8/2011 | Brandt et al. | |
| 2012/0045623 A1 | 2/2012 | Delaney | |
| 2012/0167510 A1 | 7/2012 | Brandt et al. | |
| 2012/0244340 A1 | 9/2012 | Peng | |
| 2013/0036694 A1 | 2/2013 | Brandt et al. | |
| 2013/0164524 A1 | 6/2013 | Letts et al. | |
| 2013/0252005 A1 | 9/2013 | Savargaonikar et al. | |
| 2013/0296497 A1 | 11/2013 | Jeong et al. | |
| 2014/0011008 A1 | 1/2014 | Letts et al. | |
| 2014/0127443 A1 | 5/2014 | Zhou | |
| 2014/0150960 A1 | 6/2014 | Peng | |
| 2014/0302295 A1 | 10/2014 | Thies et al. | |
| 2014/0373467 A1 | 12/2014 | Wang et al. | |
| 2015/0038629 A1 | 2/2015 | Ultsch | |
| 2015/0119515 A1 | 4/2015 | Frei et al. | |
| 2015/0152643 A1 | 6/2015 | Hubbard | |
| 2015/0174871 A1 | 6/2015 | Sollmann | |
| 2015/0218331 A1 | 8/2015 | Low | |
| 2015/0314511 A1 | 11/2015 | Stoiljkovic et al. | |
| 2016/0024794 A1 | 1/2016 | Jenkins et al. | |
| 2016/0207283 A1 | 7/2016 | Wang | |
| 2016/0312470 A1 | 10/2016 | Wang et al. | |
| 2017/0044770 A1 | 2/2017 | Hubbard et al. | |
| 2017/0203555 A1 | 7/2017 | Wang et al. | |
| 2018/0023301 A1 | 1/2018 | Wang et al. | |
| 2018/0094439 A1 | 4/2018 | Wang et al. | |
| 2018/0162109 A1 | 6/2018 | Gopalan et al. | |
| 2018/0162971 A1 | 6/2018 | Chen et al. | |
| 2018/0355616 A1 | 12/2018 | Hubbard et al. | |
| 2019/0003184 A1 | 1/2019 | Wang et al. | |
| 2019/0003185 A1 | 1/2019 | Wang et al. | |

FOREIGN PATENT DOCUMENTS

| | | | |
|---|---|---|---|
| EP | 1655331 A1 | 5/2006 | |
| WO | 2001066627 A1 | 9/2001 | |
| WO | 2001096110 A1 | 12/2001 | |
| WO | 2003016168 A1 | 2/2003 | |
| WO | 2007136761 A1 | 11/2007 | |
| WO | 2013102208 A1 | 7/2013 | |
| WO | 2014001224 A1 | 1/2014 | |
| WO | 2014008501 A1 | 1/2014 | |
| WO | 2014078760 A1 | 5/2014 | |
| WO | 2014105809 A1 | 7/2014 | |
| WO | 2015089384 A1 | 6/2015 | |
| WO | 2015164852 A1 | 10/2015 | |
| WO | 2016127164 A1 | 8/2016 | |
| WO | WO-2017117329 A1 * | 7/2017 | B32B 13/042 |

OTHER PUBLICATIONS

Astm D 6878-03 standard, 2003, 3 Pages. (Year: 2003).
International Search Report and Written Opinion for Appl. No. PCT/US2016/016975 dated Apr. 26, 2016.
International Search Report and Written Opinion for Appl. No. PCT/US2015/027698 dated Jul. 30, 2015. pp. 1-10.
International Search Report and Written Opinion for Appl. No. PCT/US2015/041707 dated Sep. 8, 2015, pp. 1-3.
International Search Report and Written Opinion for Appl. No. PCT/US2016/069073 dated Apr. 3, 2017, pp. 1-10.
International Search Report and Written Opinion for Appl. No. PCT/US2016/016960 dated Apr. 26, 2016.
Thermal Tech Equipment. Shore Durometer Conversion Chart, Jun. 13, 2003, p. 1.
U.S. Appl. No. 15/548,912.
U.S. Appl. No. 15/548,938.
U.S. Appl. No. 15/306,537.
U.S. Appl. No. 16/108,282.
U.S. Appl. No. 16/066,699.
U.S. Appl. No. 16/066,828.
U.S. Appl. No. 15/103,542.
U.S. Appl. No. 15/327,867.
PCT Application No. PCT/US2020/013529.
PCT Application No. PCT/US2020/017410.

(56) References Cited

OTHER PUBLICATIONS

International Search Report and Written Opinion for Appl. No. PCT/US2020/013529 dated Apr. 21, 2020.
International Search Report and Written Opinion for Appl. No. PCT/US2020/017410 dated Jun. 4, 2020.
International Search Report and Written Opinion for Appl. No. PCT/US2016/069076 dated Apr. 13, 2017.

* cited by examiner

MULTI-LAYERED THERMOPLASTIC ROOFING MEMBRANES

This application is a continuation application of U.S. application Ser. No. 17/421,751 filed on Jul. 9, 2021, which is a national-stage application of PCT/US2020/013529 filed on Jan. 14, 2020, and claims the benefit of U.S. provisional application No. 62/792,699 filed on Jan. 15, 2019, and U.S. provisional application No. 62/792,299 filed on Jan. 14, 2019, which are incorporated herein by reference.

FIELD OF THE INVENTION

Embodiments of the present invention relate to multi-layered thermoplastic roofing membranes. In one or more embodiments, the membranes include one or more layers including a propylene-based elastomer sandwiched between layers including an ethylene-based olefinic block copolymer.

BACKGROUND OF THE INVENTION

Thermoplastic roofing membranes, especially those membranes engineered to cover flat or low-sloped roofs, are known in the art. In fact, many of these membranes are engineered to meet the industry standards defined in ASTM D-790. Among the performance requirements provided in this industry standard, thermoplastic roofing membranes must meet threshold requirements for tensile strength and tear strength. Tensile strength is an indicator of seam strength, and the seam strength must withstand wind uplift forces. Tear strength is primarily important from the standpoint of fastener pull through. That is, where the membrane is mechanically attached to the roof surface, the membrane must be able to withstand threshold wind uplift forces without tear at the location of the fastener.

Many commercially-available thermoplastic roofing membranes include fabric-reinforced thermoplastic sheets. These membranes are fabricated by sandwiching a reinforcing fabric between two extruded thermoplastic sheets to provide a laminated structure. The thermoplastic extruded sheets, which can be the same or different, often include ethylene-propylene reactor copolymers (e.g. CA10A available from Lyondellbasell), together with various additives, such as inert filler, anti-weathering additives, and flame retardants. As the skilled person appreciates, the type and amount of additives employed, such as the filler, can impact the mechanical properties of the membrane including tensile and tear strength.

While industry standards for thermoplastic roofing membranes are designed with an eye toward mechanically-attached thermoplastic roofing systems, fully-adhered systems also exist. In fact, fully-adhered systems are often viewed as superior roof systems. As the skilled person appreciates, a fully-adhered system is installed by using an adhesive that attaches the membrane to the roof surface, where the adhesive substantially contacts all of the membrane surface adjacent to the roof deck. In practice, liquid bond adhesives or pressure-sensitive adhesives that are factory applied to the membrane are often used.

A problem encountered when installing fully-adhered thermoplastic roofing sheets relates to the stiffness of the roofing sheet. As the skilled person appreciates, the integrity of a fully-adhered system can hinge on the degree to which the overall surface of the membrane is adhered. Where areas or pockets exist that are not adhered, the system can fail wind uplift tests. This is particularly true where the membrane is not fully adhered over uneven surfaces in the roof, such as fastening plates that are often used to secure underlying insulation boards. The skilled person understands that the stiffness of the sheet creates problems when attempting to evenly apply the sheet over the roof surface, especially uneven substrates. A goal often sought is the ability to view the underlying contours of the roof surface though the membrane, which is indicative of complete adhesion to the roof. Where the membrane is too stiff, the membrane will not contour to the underlying surface. A term often used in the art is telegraphing, which refers to the ability of the sheet to contour to the substrate and thereby allow the presence of the substrate to be noticed with the sheet in place.

Roofing membranes prepared from propylene-based copolymers are known. For example, U.S. Publ. No. 2010/0197844 teaches non-reinforced TPO membranes, wherein the TPO may be prepared according to U.S. Pat. No. 6,927,258, which discloses polymeric blends including a first polymer having a melt temperature above 110° C. and a heat of fusion of at least 75 J/g, and a second polymer having a melting point of less than 105° C. and a heat of fusion of less than 75 J/g. Similar propylene-based elastomers are disclosed in U.S. Publ. No. 2004/0198912, which discloses membranes, such as roof sheeting, formed from a blend of a first polymer having a melting point from 25° C. to 70° C., and a heat of fusion from 2 J/g to 25 J/g, a second polymer having a melting point greater than 130° C. and heat of fusion of greater than 80 J/g, from 1 to 40% by weight inorganic filler, and from 1 to 25% by weight processing oil.

Roofing membranes prepared from ethylene-based olefinic block copolymers are known. For example, International Publication Nos. 2016/127164 and 2016/127169 teach multi-layered roofing membranes wherein at least one layer of the multi-layered membrane includes ethylene-based olefinic block copolymer, which are block copolymers that include a first plurality of ethylene-α-olefin blocks having low α-olefin content (hard segments) and a second plurality of ethylene-α-olefin blocks having a high α-olefin content (soft segments). The layer in which the ethylene-based olefinic block copolymers is present includes at least 10% by weight ethylene-based olefinic block copolymer based on the polymeric content of the layer.

SUMMARY OF THE INVENTION

One or more embodiments of the present invention provide a multi-layered membrane comprising skin layers including an ethylene-based olefinic block copolymer (EBOC); and two or more core layers including a propylene-based elastomer (PBE).

Yet other embodiments of the present invention provide a method of making the roofing membranes of any of the preceding claims, the method comprising (i) forming a first co-extrudate by co-extruding a first composition including an ethylene-based olefinic copolymer and a second composition including a propylene-based elastomer; (ii) forming a second co-extrudate by co-extruding a third composition including a propylene-based elastomer and a fourth composition including an ethylene-based olefinic copolymer; and (iii) laminating the first co-extrudate to the second co-extrudate.

DETAILED DESCRIPTION OF ILLUSTRATIVE EMBODIMENTS

Embodiments of the invention are based, at least in part, on the discovery of a multi-layered thermoplastic roofing membrane that includes ethylene-based olefinic block copolymer in each of the skin layers (i.e. the external layers of the multi-layered thermoplastic membrane) and propylene-based elastomer in the core layers. The presence of the propylene-based elastomer in the core layers provides advantageous reduction in membrane stiffness while the absence of propylene-based elastomer in the skin layers provides a membrane that does not demonstrate deleterious tack, which can lead to blocking (i.e. the membrane sticks to itself upon rolling). Moreover, by constructing the membrane with ethylene-based olefinic block copolymer in the skin layers, deleterious tack is avoided without an appreciable increase in membrane stiffness.

Membrane Construction

Figure 1:
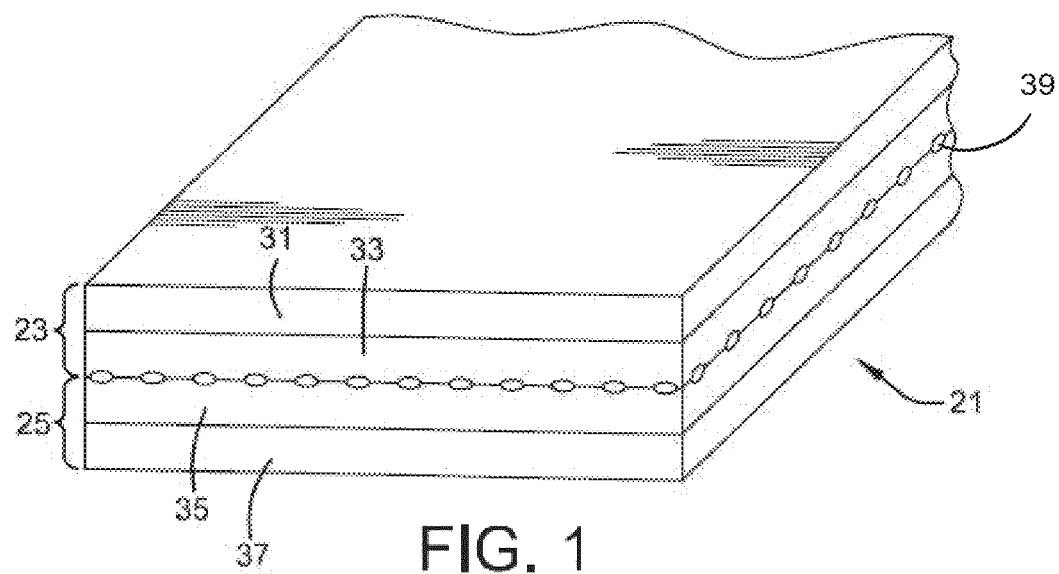
FIG. 1 is a perspective view of a multi-layered thermoplastic membrane according to embodiments of the present invention.

FIG. 1, which shows multi-layered thermoplastic membrane 21, which may also be referred to as panel 21, or multi-layered roofing membrane 21, or simply membrane 21, has a generally planar configuration and includes first external layer 31, second external layer 37, first internal layer 33, and second internal layer 35.

In one or more embodiments, first external layer 31 is the uppermost layer of the multi-layered thermoplastic membrane. In other words, when installed, layer 31 is exposed to the environment during use. As a result, first external layer 31 may also be referred to as top layer 31. In one or more embodiments, second external layer 37 is the lowermost layer of the membrane. In other words, when installed, layer 37 is the layer that is adjacent to and/or attached to the roof substrate during use. As a result, second external layer 37 may also be referred to as bottom layer 37. Top layer 31 and bottom layer 37 may be referred to collectively as skin layers 31, 37.

In one or more embodiments, first internal layer 33 is adjacent to top layer 31 and may therefore be referred to as upper-middle layer 33. Likewise, second internal layer 35 is adjacent to bottom layer 37 and may therefore be referred to as lower-middle layer 35. Upper-middle layer 33 and lower-middle layer 35 may be referred to collectively as core layers 33, 35. In one or more embodiments, the membrane of the present invention includes a reinforcing fabric 39 sandwiched between first internal layer 33 and second internal layer 35.

In one or more embodiments, layer 31 and layer 33 may be coextruded to form a coextrudate 23. Likewise, layer 35 and layer 37 may be coextruded to form a coextrudate 25. In one or more embodiments, coextrudate 23 is laminated to coextrudate 25, optionally with a reinforcing fabric 39 disposed therebetween. The skilled person will appreciate that first coextrudate 23 and second coextrudate 25 may include additional coextruded layers without departing from the concepts of the invention so long as the external layers (i.e. skin layers 31, 37) include ethylene-based olefinic block copolymer and one or more of the internal layer(s) include propylene-based elastomer. In one or more embodiments, the layers sandwiching optional reinforcing fabric 39 include propylene-based elastomer; in other words, those layers adjacent to fabric 39 include propylene-based elastomer.

Skin Layers

As suggested above, top layer 31 and bottom layer 37 include ethylene-based olefinic block copolymer (EBOC). In one or more embodiments, skin layers 31, 37 include EBOC and a complementary thermoplastic material. In one or more embodiments, skin layers 31, 37 are substantially devoid, and in other embodiments are devoid of propylene-based elastomer, which substantially devoid refers to that amount or less that would otherwise have an appreciable impact on the invention (e.g. provide a deleterious amount of tack to skin layers 31, 37).

In one or more embodiments, skin layers 31, 37 include at least 10, in other embodiments at least 40, and in other embodiments at least 60% by weight EBOC based upon the total weight of the thermoplastic component of the layer. In these or other embodiments, skin layers 31, 37 include at most 100, in other embodiments at most 80, and in other embodiments at most 40% by weight EBOC based upon the total weight of the thermoplastic component of the layer. In one or more embodiments, skin layers 31, 37 include from about 10 to about 100, in other embodiments from about 20 to about 90, in other embodiments from about 40 to about 85%, and in other embodiments from about 50 to about 80% by weight EBOC based upon the total weight of the thermoplastic component of the layer.

In one or more embodiments, the balance of the polymeric content of the skin layers 31, 37 includes a compatible thermoplastic resin other than an EBOC (e.g. an ethylene-based copolymer such as low density or linear low density polyethylene). In these embodiments, skin layers 31, 37 may include at least 5, in other embodiments at least 20, and in other embodiments at least 40% by weight compatible thermoplastic resin based upon the total weight of the thermoplastic component of the layer. In these or other embodiments, skin layers 31, 37 may include at most 100, in other embodiments at most 80, and in other embodiments at most 40% by weight compatible thermoplastic resin based upon the total weight of the thermoplastic component of the layer. In one or more embodiments, skin layers 31, 37 may include from about 10 to about 100, in other embodiments from about 20 to about 90, and in other embodiments from about 50 to about 80% by weight compatible thermoplastic resin based upon the total weight of the thermoplastic component of the layer.

In one or more embodiments, skin layers 31, 37 may include first and second EBOCs, where the EBOCs are distinguished based upon melt flow rate. For example, skin layers 31, 37 may include a first EBOC (e.g. low melt index) and a second EBOC (e.g. high melt index). In one or more embodiments, skin layers 31, 37 may include at least 40, in other embodiments at least 50, and in other embodiments at least 60 weight % of the first EBOC based upon the total weight of the first EBOC and the second EBOC combined. In these or other embodiments, skin layers 31, 37 may include at most 99, in other embodiments at most 90, and in other embodiments at most 80 weight % of the first EBOC based upon the total weight of the first EBOC and the second EBOC combined. In one or more embodiments, skin layers 31, 37 may include from about 30 to about 99, in other embodiments from about 50 to about 90, and in other weight % embodiments from about 60 to about 80 weight % of the first EBOC based upon the total weight of the first EBOC and the second EBOC combined.

In one or more embodiments, skin layers 31, 37 may include a relatively high loading of filler. In one or more embodiments, skin layers 31, 37 include at least 10, in other embodiments at least 15 weight percent, in other embodiments at least 20 weight %, in other embodiments at least 25 weight %, in other embodiments at least 30 weight %, 33 weight %, in other embodiments at least 40 weight %, and in other embodiments at least 45 weight % of the filler (e.g. mineral filler) based on the entire weight of the given layer. In one or more embodiments, skin layers 31, 37 include at most 80 weight %, in other embodiments at most 70 weight %, and in other embodiments at most 60 weight % of the filler based on the entire weight of the given layer. In one or more embodiments, skin layers 31, 37 include from about 33 to about 80, in other embodiments from about 40 to about 70, and in other embodiments from about 45 to about 60 weight % of the filler based upon the entire weight of the given layer.

In one or more embodiments, top layer 31 includes at least 15 weight %, in other embodiments at least 25 weight %, in other embodiments at least 30 weight %, and in other embodiments at least 35 weight % magnesium hydroxide. In these or other embodiments, bottom layer 37 includes at least 5 weight %, in other embodiments at least 10 weight %, in other embodiments at least 15 weight %, in other embodiments at least 20 weight %, in other embodiments at least 25 weight %, and in other embodiments at least 30 weight % mineral filler (e.g. calcium carbonate). In one or more embodiments, the mineral filler in bottom layer 37 is a mineral filler other than magnesium hydroxide (e.g. calcium carbonate). In other embodiments, bottom layer 37 includes magnesium hydroxide in combination with another mineral filler such as calcium carbonate. In one or more embodiments, top layer 31 is devoid of calcium carbonate.

Core Layers

As suggested above, core layers 33, 35 include propylene-based elastomer. In one or more embodiments, core layers 33, 35 include propylene-based elastomer and a complementary thermoplastic material. In one or more embodiments, core layers 33, 35 include propylene-based elastomer, EBOC, and optionally a complementary thermoplastic material.

In one or more embodiments, core layers 33, 35 include greater than 8% by weight, in other embodiments greater than 10% by weight, in other embodiments greater than 12% by weight, in other embodiments greater than 15% by weight, in other embodiments greater than 18% by weight, in other embodiments greater than 20% by weight, in other embodiments greater than 22% by weight, and in other embodiments greater than 24% by weight propylene-based elastomer based upon the polymeric content of the given layer. In these or embodiments, core layers 33, 35 include less than 100% by weight, in other embodiments less than 70% by weight, in other embodiments less than 60% by weight, in other embodiments less than 50% by weight, in other embodiments less than 45% by weight, in other embodiments less than 40% by weight, in other embodiments less than 35% by weight, in other embodiments less than 33% by weight, in other embodiments less than 30% by weight, in other embodiments less than 27% by weight, in other embodiments less than 25% by weight, and in other embodiments less than 23% by weight propylene-based elastomer based upon the polymeric content of the given layer. In one or more embodiments, core layers 33, 35 include from about 8 to about 80, in other embodiments from about 10 to about 60, and in other embodiments from about 12 to about 50% by weight propylene-based elastomer based upon the polymeric content of the given layer.

In one or more embodiments, the balance of the polymeric content of the core layers 33, 35 includes a compatible thermoplastic resin other than a propylene-based elastomer (e.g. an EBOC or an ethylene-based copolymer).

In one or more embodiments, core layers 33, 35 may include a relatively high loading of filler. In one or more embodiments, core layers 33, 35 include at least 10, in other embodiments at least 15 weight %, in other embodiments at least 20 weight %, in other embodiments at least 25 weight %, in other embodiments at least 30 weight %, 33 weight %, in other embodiments at least 40 weight %, and in other embodiments at least 45 weight % of the filler (e.g. mineral filler) based on the entire weight of the given layer. In one or more embodiments, core layers 33, 35 include at most 80 weight %, in other embodiments at most 70 weight %, and in other embodiments at most 60 weight % of the filler based on the entire weight of the given layer. In one or more embodiments, core layers 33, 35 include from about 33 to about 80, in other embodiments from about 40 to about 70, and in other embodiments from about 45 to about 60 weight % of the filler based upon the entire weight of the given layer.

In one or more embodiments, core layers 33, 35 includes at least 15 weight %, in other embodiments at least 25 weight %, in other embodiments at least 30 weight %, and in other embodiments at least 35 weight % calcium carbonate. In one or more embodiments, core layers 33, 35 include magnesium hydroxide in combination with another mineral filler such as calcium carbonate.

Thickness of Layers

In one or more embodiments, the overall thickness of membrane 21 is greater than 45, in other embodiments greater than 50, and in other embodiments greater than 55 mil. In these or other embodiments, the overall thickness of membrane 21 is less than 75, in other embodiments less than 70, and in other embodiments less than 65 mil. In one or more embodiments, the thickness of membrane 21 is from about 45 to about 75, in other embodiments from about 50 to about 70, and in other embodiments from about 55 to about 65 mil.

In one or more embodiments, top layer 31 may account for about 15 to about 45%, in other embodiments from about 18 to about 35%, and in other embodiments from about 20 to about 30% of the overall thickness of the membrane.

In one or more embodiments, bottom layer 37 may account for about 15 to about 45%, in other embodiments from about 18 to about 35%, and in other embodiments from about 20 to about 30% of the overall thickness of the membrane.

In one or more embodiments, upper middle layer 33 may account for about 15 to about 45%, in other embodiments from about 18 to about 35%, and in other embodiments from about 20 to about 30% of the overall thickness of the membrane.

In one or more embodiments, lower middle layer 35 may account for about 15 to about 45%, in other embodiments from about 18 to about 35%, and in other embodiments from about 20 to about 30% of the overall thickness of the membrane.

Membrane Composition

Propylene-Based Elastomer

In one or more embodiments, the advantageously low stiffness is attributable to the polymeric composition of one or more layers of the membrane. In one or more embodiments, the polymeric composition of one or more layers includes a propylene-based elastomer. In these or other embodiments, the polymeric composition includes a blend of a propylene-based elastomer and a propylene-based thermoplastic resin. In one or more embodiments, both propylene-based elastomer and the propylene-based thermoplastic resin have isotactic propylene sequences long enough to crystallize. In this regard, U.S. Pat. No. 6,927,258, and U.S. Publ. Nos. 2004/0198912 and 2010/0197844 are incorporated herein by reference.

In one or more embodiments, the propylene-based elastomer is propylene/alpha-olefin copolymer with semi-crystalline isotactic propylene segments. The alpha-olefin content (e.g. polymerized ethylene content) may range from about 5 to about 18%, or in other embodiments from about 10 to about 15%.

In one or more embodiments, the propylene-based elastomer is characterized by a melting point that is less than 110° C., in other embodiments less than 105° C., and in other embodiments less than 100° C. In these or other embodiments, the propylene-based elastomer is characterized by a heat of fusion of less than 80 J/g, in other embodiments less than 75 J/g, and in other embodiments less than 70 J/g. Melting point and heat of fusion can be determined by DSC.

In one embodiment, the propylene based elastomers of the present invention have a glass transition temperature (Tg) in the range of about −25 to −35° C. The Tg as used herein is the temperature above which a polymer becomes soft and pliable, and below which it becomes hard and glassy. The propylene-based elastomers may have a MFR range measured at 230° C. of between about 0.5 to about 25, and a melt temperature range of about 50 to 120° C.

In one embodiment, the propylene-based elastomers of the present invention have a shore A hardness range of about 60 to about 90.

In those embodiments where the propylene-based elastomer is blended with a propylene-based thermoplastic resin, the propylene-based thermoplastic resin may include a crystalline resin. In particular embodiments, the propylene-based thermoplastic resin is characterized by a melting point that is greater than 110° C. and a heat of fusion greater than 75 J/g. In one or more embodiments, the propylene-based thermoplastic resin is stereoregular polypropylene. In one or more embodiments, the weight ratio of the propylene-based elastomer to the thermoplastic resin within the blend may vary in the range of 1:99 to 95:5 by weight and, in particular, in the range 2:98 to 70:30 by weight.

In one embodiment, the propylene-based elastomers of the present invention have a flexural modulus range of about 500 to about 6000 Psi, or in other embodiments about 1500 to about 5000 psi.

Ethylene-Based Olefinic Block Copolymer

In general, the ethylene-based olefinic block copolymers include block copolymers including a first plurality of ethylene-α-olefin blocks having low α-olefin content and a second plurality of ethylene-α-olefin blocks having a high α-olefin content. For purposes of this specification, the α-olefin may be referred to as a comonomer. Also, for purposes of this specification, the first plurality may be referred to as the hard blocks since these blocks are characterized by a relatively high melt temperature, and the second plurality of blocks may be referred to as the soft blocks since these block are characterized by a low glass transition temperature. In one or more embodiments, the hard blocks are crystallizable and the soft blocks are amorphous. In one or more embodiments, the α-olefin includes $C_4$ or higher α-olefins. In particular embodiments, the α-olefin is selected from butane, hexene, and octene. In particular embodiments, the α-olefin is octene.

In one or more embodiments, the ethylene-based olefinic block copolymer includes hard and soft blocks alternating in $(AB)_n$ pattern where A is a hard block, B is a soft block, and $n$ is an integer greater than 1 including 2, 3, 4, 5, 10, 20, 40, 60, 80, 100, or higher.

As suggested above, the hard blocks, which may also be referred to as hard segments, have a relatively low comonomer content (i.e. α-olefin). In one or more embodiments, the comonomer content (i.e. comonomer in polymerized form) of the hard block is less than 5 weight %, in other embodiments less than 2 weight %, and in other embodiments less than 1 weight %, with the balance of the polymeric units deriving from ethylene. Accordingly, the hard segments may include greater than 95 weight %, in other embodiments greater than 98 weight %, and in other embodiments greater than 99 weight % polymeric units deriving from ethylene. In particular embodiments, the hard segments exclusively include or substantially include ethylene-derived units.

The soft block, which may also be referred to as soft segments, have a relatively high comonomer content (i.e. α-olefin). In one or more embodiments, the comonomer content (i.e. comonomer in polymerized form) of the soft block is greater than 5 weight %, in other embodiments greater than 8 weight %, in other embodiments greater than 10 weight %, in other embodiments greater than 15 weight %, in other embodiments greater than 25 weight %, in other embodiments greater than 35 weight %, in other embodiments greater than 45 weight %, and in other embodiments greater than 60 weight %, with the balance including ethylene-derived units.

In one or more embodiments, the ethylene-based olefinic block copolymers employed in the present invention are characterized by a density of less than 0.9 g/cm³, in other embodiments less than 0.89 g/cm³, in other embodiments less than 0.885 g/cm³, and in other embodiments less than 0.875 g/cm³. In these or other embodiments, the density of the ethylene-based olefinic block copolymers is greater than 0.85 g/cm³ and in other embodiments greater than 0.86 g/cm³. As the skilled person appreciates, density can be determined according to ASTM D792.

In one or more embodiments, the ethylene-based olefinic block copolymers employed in the present invention are characterized by a melt temperature, as measured by differential scanning calorimetry as described in U.S. Publ. No. 2006/0199930, of at least 105, in other embodiments at least 110, in other embodiments at least 115, and in other embodiments at least 120° C. In these or other embodiments, the ethylene-based olefinic block copolymers are characterized by a melt temperature of less than 130 and in other embodiments less than 125° C.

In one or more embodiments, the first EBOC, which is characterized by a relatively low melt index, may have a melt index, as determined by ASTM D1238 or ISO 1133 (2.16 kg load at 190° C.), of less than 5 g/10 min, in other embodiments less than 2 g/10 min, and in other embodiments less than 1 g/10 min. In these or other embodiments, the melt index of the first EBOC is from about 0.1 to about 5 g/10 min, in other embodiments from about 0.3 to about 2 g/10 min, and in other embodiments from about 0.5 to about 1 g/10 min.

In one or more embodiments, the second EBOC, which is characterized by a relatively high melt index, as determined by ASTM D1238 or ISO 1133 (2.16 kg load at 190° C.), may have a melt index of greater than 5 g/10 min, in other embodiments greater than 15 g/10 min, and in other embodiments greater than 25 g/10 min. In these or other embodiments, the melt index of the second EBOC is from about 5 to about 50 g/10 min, in other embodiments from about 15 to about 40 g/10 min, and in other embodiments from about 25 to about 35 g/10 min.

In one or more embodiments, the ethylene-based olefinic block copolymers employed in the present invention are characterized by a glass transition temperature, as measured by differential scanning calorimetry, of at less than 0° C., in other embodiments less than −20° C., in other embodiments less than −30° C., in other embodiments less than −40° C., and in other embodiments less than −50° C. In these or other embodiments, the ethylene-based olefinic block copolymers are characterized by a glass transition temperature of from about −70° C. to 0° C., or in other embodiments from about −50° C. to about 0° C.

Useful ethylene-based olefinic block copolymers that may be employed in the present invention are known in the art as described in U.S. Pat. Nos. 7,893,166 and 7,355,089 and U.S. Publ. No. 2010/0084158, which are incorporated herein by reference. Useful ethylene-based olefinic block copolymers are commercially available under the tradename INFUSE (Dow Chemical Company) including those specific polymers available under the tradenames 9010 and 9900.

Compatible Thermoplastic Resin

As suggested above, the layers of the membranes of the present invention, particularly the polymer matrix, may include polymer in addition to the propylene-based elastomer and/or the ethylene-based olefinic block copolymer. In one or more embodiments, these polymers are compatible with the propylene-based elastomer and/or ethylene-based olefinic block copolymer, and may be referred to as compatible thermoplastic polymer or simply as conventional thermoplastic polymer.

In one or more embodiments, the compatible thermoplastic polymer may include polyethylene, polypropylene, olefin-based thermoplastic polymers, such as, but not limited to, polyethylene, polypropylene, ethylene-propylene copolymers, propylene-based elastomer, ethylene-based olefinic block copolymer, and the like. Exemplary ethylene-based thermoplastic polymers include ethylene-hexane or ethylene-octene copolymers.

In one or more embodiments, compatible thermoplastic polymer may include an olefinic reactor copolymer, which may also be referred to as in-reactor copolymer. Reactor copolymers are generally known in the art and may include blends of olefinic polymers that result from the polymerization of ethylene and α-olefins (e.g. propylene) with sundry catalyst systems. In one or more embodiments, these blends are made by in-reactor sequential polymerization. Reactor copolymers useful in one or more embodiments include those disclosed in U.S. Pat. No. 6,451,897, which is incorporated therein by reference. Reactor copolymers, which are also referred to as TPO resins, are commercially available under the tradename HIFAX™ (Lyondellbasell); these materials are believed to include in-reactor blends of ethylene-propylene rubber and polypropylene or polypropylene copolymers. Other useful thermoplastic olefins include those available under the tradename T00G-00 (Ineos). In one or more embodiments, the in-reactor copolymers may be physically blended with other polyolefins. For example, in reactor copolymers may be blended with linear low density polyethylene.

Functionalized Polymers

In one or more embodiments, one or more layers of the membranes of this invention includes a functionalized polymer. In one or more embodiments, the functionalized polymer is a thermoplastic polymer that includes at least one functional group. The functional group, which may also be referred to as a functional substituent or functional moiety, includes a hetero atom. In one or more embodiments, the functional group includes a polar group. Examples of polar groups include hydroxy, carbonyl, ether, ester halide, amine, imine, nitrile, oxirane (e.g. epoxy ring) or isocyanate groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g. polymerization or grafting reaction) with maleic anhydride, or a β-alkyl substituted propanoic acid group or derivative thereof. In one or more embodiments, the functional group is pendant to the backbone of the hydrocarbon polymer. In these or other embodiments, the functional group may include an ester group. In specific embodiments, the ester group is a glycidyl group, which is an ester of glycidol and a carboxylic acid. A specific example is a glycidyl methacrylate group.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984, which are incorporated herein by reference.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight (Mw) of from about 100 kg/mole to about 2,000 kg/mole, and in other embodiments from about 300 kg/mole to about 600 kg/mole. They may also characterized by a number-average molecular weight (Mn) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymer, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120° C. to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight % functionalization, in these or other embodiments, the functionalized thermoplastic polymers may include less than 10% by weight, in other embodiments less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), and EXXELOR™ (ExxonMobil). Another examples includes polymers or oligomers including one or more glycidyl methacrylate groups such as Lotader™ AX8950 (Arkema).

Weathering Additives

As indicated above, one or more layers of the membranes of this invention include weathering additives. In one or more embodiments, the weathering additives may include UV blockers, UV stabilizers, antioxidants, and antiozonants. Exemplary UV stabilizers include Tinuvin™ 622. Exemplary antioxidants include Irganox™ 1010. The skilled person can readily select an appropriate amount of weather additive to employ in one or more of the layers of the membranes of the present invention (e.g. the top layer).

Filler

In one or more embodiments, in addition to or lieu of the calcium carbonate, other mineral fillers may be employed. These mineral fillers may include, but are not limited to, clays, silicates, titanium dioxide, talc (magnesium silicate), mica (mixtures of sodium and potassium aluminum silicate), alumina trihydrate, antimony trioxide, calcium carbonate, titanium dioxide, silica, magnesium hydroxide, calcium borate ore, and mixtures thereof.

Suitable clays may include airfloated clays, water-washed clays, calcined clays, surface-treated clays, chemically-modified clays, and mixtures thereof.

Suitable silicates may include synthetic amorphous calcium silicates, precipitated, amorphous sodium aluminosilicates, and mixtures thereof.

Suitable silica (silicon dioxide) may include wet-processed, hydrated silicas, crystalline silicas, and amorphous silicas (noncrystalline).

In one or more embodiments, the fillers are not surface modified or surface functionalized.

In one or more embodiments, the mineral fillers are characterized by an average particle size of at least 1 μm, in other embodiments at least 2 μm, in other embodiments at least 3 μm, in other embodiments at least 4 μm, and in other embodiments at least 5 μm. In these or other embodiments, the mineral fillers are characterized by an average particle size of less than 15 μm, in other embodiments less than 12 μm, in other embodiments less than 10 μm, and in other embodiments less than 8 μm. In these or other embodiments, the mineral filler has an average particle size of between 1 and 15 μm, in other embodiments between 3 and 12 μm, and in other embodiments between 6 and 10 μm.

Other Ingredients

One or more layers of the thermoplastic membranes employed in the practice of this invention may also include other ingredients such as those that are conventional in thermoplastic membranes. For example, other useful additives or constituents may include flame retardants other than magnesium hydroxide, stabilizers, pigments, and fillers.

In one or more embodiments, useful flame retardants include and compound that will increase the burn resistivity, particularly flame spread such as tested by UL 94 and/or UL 790, of the laminates of the present invention. Useful flame retardants include those that operate by forming a char-layer across the surface of a specimen when exposed to a flame. Other flame retardants include those that operate by releasing water upon thermal decomposition of the flame retardant compound. Useful flame retardants may also be categorized as halogenated flame retardants or non-halogenated flame retardants.

Exemplary non-halogenated flame retardants include magnesium hydroxide, aluminum trihydrate, zinc borate, ammonium polyphosphate, melamine polyphosphate, and antimony oxide ($Sb_2O_3$). Magnesium hydroxide ($Mg(OH)_2$) is commercially available under the tradename Vertex™ 60, ammonium polyphosphate is commercially available under the tradename Exolite™ AP 760 (Clarian), which is sold together as a polyol masterbatch, melamine polyphosphate is available under the tradename Budit™ 3141 (Budenheim), and antimony oxide ($Sb_2O_3$) is commercially available under the tradename Fireshield™. Those flame retardants from the foregoing list that are believed to operate by forming a char layer include ammonium polyphosphate and melamine polyphosphate.

In one or more embodiments, treated or functionalized magnesium hydroxide may be employed. For example, magnesium oxide treated with or reacted with a carboxylic acid or anhydride may be employed. In one embodiment, the magnesium hydroxide may be treated or reacted with stearic acid. In other embodiments, the magnesium hydroxide may be treated with or reacted with certain silicon-containing compounds. The silicon-containing compounds may include silanes, polysiloxanes including silane reactive groups. In other embodiments, the magnesium hydroxide may be treated with maleic anhydride. Treated magnesium hydroxide is commercially available. For example, Zerogen™ 50.

Examples of halogenated flame retardants may include halogenated organic species or hydrocarbons such as hexabromocyclododecane or N,N'-ethylene-bis-(tetrabromophthalimide). Hexabromocyclododecane is commercially available under the tradename CD-75P™ (ChemTura). N,N'-ethylene-bis-(tetrabromophthalimide) is commercially available under the tradename Saytex™ BT-93 (Albemarle).

In one or more embodiments, the use of char-forming flame retardants (e.g. ammonium polyphosphate and melamine polyphosphate) has unexpectedly shown advantageous results when used in conjunction with nanoclay within the cap layer of the laminates of the present invention. It is believed that there may be a synergistic effect when these compounds are present in the cap layer. As a result, the cap layer of the laminates of the certain embodiments of the present invention are devoid of or substantially devoid of halogenated flame retardants and/or flame retardants that release water upon thermal decomposition. Substantially devoid referring to that amount or less that does not have an appreciable impact on the laminates, the cap layer, and/or the burn resistivity of the laminates.

In one or more embodiments, one or more layers of the membranes of the present invention may include expandable graphite, which may also be referred to as expandable flake graphite, intumescent flake graphite, or expandable flake. Generally, expandable graphite includes intercalated graphite in which an intercallant material is included between the graphite layers of graphite crystal or particle. Examples of intercallant materials include halogens, alkali metals, sulfates, nitrates, various organic acids, aluminum chlorides, ferric chlorides, other metal halides, arsenic sulfides, and thallium sulfides. In certain embodiments of the present invention, the expandable graphite includes non-halogenated intercallant materials. In certain embodiments, the expandable graphite includes sulfate intercallants, also referred to as graphite bisulfate. As is known in the art, bisulfate intercalation is achieved by treating highly crystalline natural flake graphite with a mixture of sulfuric acid and other oxidizing agents which act to catalyze the sulfate intercalation. Expandable graphite useful in the applications of the present invention are generally known as described in International Publ. No. WO/2014/078760, which is incorporated herein by reference.

Commercially available examples of expandable graphite include HPMS Expandable Graphite (HP Materials Solutions, Inc., Woodland Hills, CA) and Expandable Graphite Grades 1721 (Asbury Carbons, Asbury, NJ). Other commercial grades contemplated as useful in the present invention include 1722, 3393, 3577, 3626, and 1722HT (Asbury Carbons, Asbury, NJ).

In one or more embodiments, the expandable graphite may be characterized as having a mean or average size in the range from about 30 µm to about 1.5 mm, in other embodiments from about 50 µm to about 1.0 mm, and in other embodiments from about 180 to about 850 µm. In certain embodiments, the expandable graphite may be characterized as having a mean or average size of at least 30 µm, in other embodiments at least 44 µm, in other embodiments at least 180 µm, and in other embodiments at least 300 µm. In one or more embodiments, expandable graphite may be characterized as having a mean or average size of at most 1.5 mm, in other embodiments at most 1.0 mm, in other embodiments at most 850 µm, in other embodiments at most 600 µm, in yet other embodiments at most 500 µm, and in still other embodiments at most 400 µm. Useful expandable graphite includes Graphite Grade #1721 (Asbury Carbons), which has a nominal size of greater than 300 µm.

In one or more embodiments of the present invention, the expandable graphite may be characterized as having a nominal particle size of 20×50 (US sieve). US sieve 20 has an opening equivalent to 0.841 mm and US sieve 50 has an opening equivalent to 0.297 mm. Therefore, a nominal particle size of 20×50 indicates the graphite particles are at least 0.297 mm and at most 0.841 mm.

In one or more embodiments, the expandable graphite may be characterized by an onset temperature ranging from about 100° C. to about 250° C.; in other embodiments from about 160° C. to about 225° C.; and in other embodiments from about 180° C. to about 200° C. In one or more embodiments, the expandable graphite may be characterized by an onset temperature of at least 100° C., in other embodiments at least 130° C., in other embodiments at least 160° C., and in other embodiments at least 180° C. In one or more embodiments, the expandable graphite may be characterized by an onset temperature of at most 250° C., in other embodiments at most 225° C., and in other embodiments at most 200° C. Onset temperature may also be interchangeably referred to as expansion temperature; and may also be referred to as the temperature at which expansion of the graphite starts.

In one or more embodiments, one or more layers of the membranes of the present invention include a nanoclay. Nanoclays include the smectite clays, which may also be referred to as layered silicate minerals. Useful clays are generally known as described in U.S. Pat. No. 6,414,070 and U.S. Publ. No. 2009/0269565, which are incorporated herein by reference. In one or more embodiments, these clays include exchangeable cations that can be treated with organic swelling agents such as organic ammonium ions, to intercalate the organic molecules between adjacent planar silicate layers, thereby substantially increasing the interlayer spacing. The expansion of the interlayer distance of the layered silicate can facilitate the intercalation of the clay with other materials. The interlayer spacing of the silicates can be further increased by formation of the polymerized monomer chains between the silicate layers. The intercalated silicate platelets act as a nanoscale (sub-micron size) filler for the polymer.

Intercalation of the silicate layers in the clay can take place either by cation exchange or by absorption. For intercalation by absorption, dipolar functional organic molecules such as nitrile, carboxylic acid, hydroxy, and pyrrolidone groups are desirably present on the clay surface. Intercalation by absorption can take place when either acid or non-acid clays are used as the starting material. Cation exchange can take place if an ionic clay containing ions such as, for example, $Na^+$, $K^+$, $Ca^{++}$, $Ba^{++}$, and $Li^+$ is used. Ionic clays can also absorb dipolar organic molecules.

Smectite clays include, for example, montmorillonite, saponite, beidellite, hectorite, and stevensite. In one or more embodiments, the space between silicate layers may be from about 15 to about 40×, and in other embodiments from about 17 to about 36×, as measured by small angle X-ray scattering. Typically, a clay with exchangeable cations such as sodium, calcium and lithium ions may be used. Montmorillonite in the sodium exchanged form is employed in one or more embodiments.

Organic swelling agents that can be used to treat the clay include quaternary ammonium compound, excluding pyridinium ion, such as, for example, poly(propylene glycol)bis (2-aminopropyl ether), poly(vinylpyrrolidone), dodecylamine hydrochloride, octadecylamine hydrochloride, and dodecylpyrrolidone. These treated clays are commercially available. One or more of these swelling agents can be used.

Reinforcing Fabric

In one or more embodiments, fabric 39 may include a woven, knitted, or non-woven fabric. In particular embodiments, fabric 39 may be of the type of fabric generally known in the art for preparing roofing membranes. Useful fabric substrates include warp-knit, weft-inserted fabrics, such as those that as are known in the art and, for example, described in U.S. Pat. Nos. 4,491,617, 4,539,254, 4,615,934, and 4,780,350, which are incorporated herein by reference.

Method of Making

In one or more embodiments, the membranes employed in the present invention may be generally prepared by employing conventional techniques. For example, the various ingredients of each layer can be separately fed into an extruder and extruded into membrane and, optionally, laminated into a laminate sheet. In other embodiments, the various ingredients can be combined and mixed within a mixing apparatus such as an internal mixer and then subsequently fabricated into membrane sheets or laminates.

In one or more embodiments, the membranes of the present invention may be prepared by co-extruding two distinct polymeric compositions (e.g. the top layer and the upper middle layer) into a first sheet or first co-extrudate, co-extruding two distinct polymer compositions (e.g. the bottom layer and the lower middle layer) into a second sheet or co-extrudate, and then laminating the sheets together. In particular embodiments, the reinforcing fabric is laminated to the first sheet, and then the second sheet is subsequently mated to the composite formed by the first sheet and the fabric to thereby sandwich the fabric between the sheets. In one or more embodiments, each sheet may calendared prior to laminating. In one or more embodiments, the membranes of the present invention are prepared by employing co-extrusion technology. Useful techniques include those described in co-pending U.S. Ser. Nos. 11/708,898 and 11/708,903, which are incorporated herein by reference.

In alternate embodiments, the multi-layered membranes of the present invention are prepared by employing lamination techniques in lieu of co-extrusion techniques. For example, top layer 31, upper-middle layer 33, lower-middle layer 35, and bottom layer 37 can be separately prepared by employing conventional extrusion techniques. Lamination techniques can then be employed to laminate top layer 31 to upper-middle layer 33 to for a first lamination pair, and lamination techniques can be employed to laminate bottom layer 37 to lower-middle layer 35 to form a second lamination pair. Then, with or without sandwiching a scrim or reinforcing fabric, the first lamination pair can be laminated to the second lamination pair.

Following extrusion, and after optionally joining one or more polymeric layers, or optionally joining one or more polymeric layer together with a reinforcement, the membrane may be fabricated to a desired thickness. This may be accomplished by passing the membrane through a set of squeeze rolls positioned at a desired thickness. The membrane may then be allowed to cool and/or rolled for shipment and/or storage.

The polymeric composition that may be extruded to form the polymeric sheet may include the ingredients or constituents described herein. For example, the polymeric composition may include propylene-based elastomer, filler, and functionalized polymers defined herein. The ingredients may be mixed together by employing conventional polymer mixing equipment and techniques. In one or more embodiments, an extruder may be employed to mix the ingredients. For example, single-screw or twin-screw extruders may be employed.

Membrane Characteristics

As discussed above, the membranes employed in the practice of this invention are advantageously characterized by a relatively high flexibility and low stiffness. This relatively high flexibility and low stiffness can be quantified through one or more physical properties of the membranes of this invention. For example, in one or more embodiments, storage modulus, as may be measured using dynamic mechanical analysis (DMA) may be indicative of high flexibility and low stiffness. According to embodiments of the present invention, storage modulus can be determined by using, for example, a TA Instrument Q800 DMA instrument coupled with a GCA cooling unit and the use of liquid nitrogen. A rectangular specimen of about 18.5 mm in length, 5.3 mm in width, and 1.4 mm in thickness is used and can be prepared by using a 5.3 mm film cutter (TA Instrument part number 984486.901). The specimen is loaded onto a thin film clamp using a 3 pound-force inch torque. A multi-frequency strain mode can be used for all experiments. The parameters should be customized to a 1 Hz single frequency and the amplitude kept at 10 µm. The specimen should be equilibrated at −90° C., and then ramped to 70° C. at a 2° C./minute heating rate. In view of the fabric scrim, samples can be run in duplicates for the machine direction and cross direction.

In one or more embodiments, the membranes of one or more embodiments of the present invention are characterized by a storage modulus, as determined by DMA as described herein, in the machine direction at 0° C. of less than 450 MPa, in other embodiments less than 425 MPa, in other embodiments less than 400 MPa, in other embodiments less than 375 MPa, in other embodiments less than 350 MPa, and in other embodiments less than 325 MPa. In these or other embodiments, the membranes of one or more embodiments of the present invention are characterized by a storage modulus, as determined by DMA as described herein, in the machine direction at 0° C., of from about 100 to about 450 MPa, in other embodiments from about 110 to about 400 MPa, and in other embodiments from about 125 to about 350 MPa.

In one or more embodiments, the membranes of one or more embodiments of the present invention are characterized by a storage modulus, as determined by DMA as described herein, in the machine direction at −20° C. of less than 850 MPa, in other embodiments less than 800 MPa, in other embodiments less than 750 MPa, in other embodiments less than 725 MPa, in other embodiments less than 700 MPa, and in other embodiments less than 675 MPa. In these or other embodiments, the membranes of one or more embodiments of the present invention are characterized by a storage modulus, as determined by DMA as described herein, in the machine direction at −20° C., of from about 400 to about 850 MPa, in other embodiments from about 450 to about 800 MPa, and in other embodiments from about 500 to about 750 MPa.

In one or more embodiments, the membranes may be characterized by a flexural modulus, as determined by ASTM D790, of less than 150 MPa, in other embodiments less than 130 MPa, in other embodiments less than 110 MPa, in other embodiments less than 90 MPa, in other embodiments less than 80 MPa, in other embodiments less than 70 MPa, in other embodiments less than 60 MPa, in other embodiments less than 50 MPa, in other embodiments less than 40 MPa, and in other embodiments less than 30 MPa. In these or other embodiments, the membranes may be characterized by a flexural modulus of from about 5 to about 90 MPa, in other embodiments from about 10 to about 80 MPa, and in other embodiments from about 20 to about 70 MPa.

In one or more embodiments, the membranes employed in the practice of this invention are advantageously characterized by a relatively Shore hardness (e.g. low Shore A or Shore D). In one or more embodiments, the membranes may be characterized by a Shore D hardness, as determined by ASTM D2240, of less than 40, in other embodiments less than 30, and in other embodiments less than 20. In these or other embodiments, the membranes may be characterized by a hardness of from about 70 Shore A to about 40 Shore D, in other embodiments from about 80 Shore A to about 30 Shore D, and in other embodiments from about 90 Shore A to about 20 Shore D.

In these or other embodiments, the relatively low stiffness of the membranes of this invention may be represented by a relatively low Taber stiffness. Taber stiffness is advantageous for measuring and comparing the flexibility of membranes that are, overall, fairly flexible. The skilled person understands that these Taber stiffness values can be obtained by employing a Taber stiffness tester, such as a model 150-E Taber V-5 stiffness tester. The results of the Taber stiffness test are reported in stiffness units with lower values representing membranes of lower stiffness. Typically, the Taber stiffness values obtained from the stiffness are normalized by taking into account the thickness of the membrane since the thickness of the membrane can impact the measurement obtained from the tester. For example, the measurement obtained from the tester (e.g. average stiffness), is divided by the thickness (inches) cubed, which is then divided by 100,000 to provide a normalized value. For the sake of clarity, where the average stiffness measurement from the tester is 72.8, and the thickness of the membrane is 0.053 inches, the normalized stiffness would be 4.88. In one or more embodiments, the membranes of the present invention may be characterized by a normalized Taber stiffness, in the machine direction, of less than 15, in other embodiments less than 12, in other embodiments less than 8, in other embodiments less than 6, and in other embodiments less than 5. In one or more embodiments, the membranes of the present invention may be characterized by a normalized Taber stiffness, in the cross-machine direction, of less than 15, in other embodiments less than 12, in other embodiments less than 8, in other embodiments less than 6, and in other embodiments less than 5. In these or other embodiments, the membranes may be characterized by a normalized Taber stiffness, in either the machine or cross-machine direction, of from about 1 to about 12, in other embodiments from about 2 to about 10, and in other embodiments from about 3 to about 6. In one or more embodiments, the Taber stiffness values of the membranes of the present invention are at least 50%, in other embodiments at least 75%, in other embodiments at least 100%, in other embodiments at least 120%, and in other embodiments at least 150% lower than comparative membranes prepared using propylene-based thermoplastic polyolefins such as reactor copolymers as described herein.

Fully-Adhered Roofing System

Figure 2:
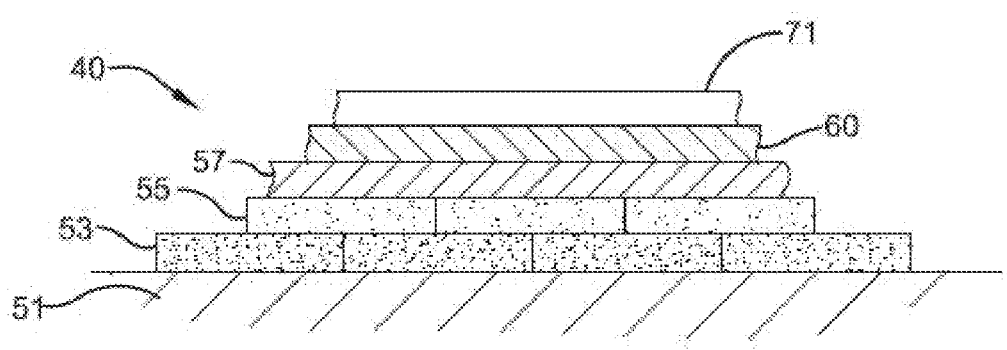
FIG. 2 is a cross-sectional view of a fully-adhered roofing system according to embodiments of the present invention.

The membranes of the present invention may advantageously be used to prepare roofing systems including fully-adhered roofing systems. In one or more embodiments, the membranes of this invention satisfy ASTM D-790-17. In these or other embodiments, the membranes of this invention satisfy ASTM D-6878-03. In these or other embodiments, the membranes of this invention satisfy ASTM D-6878-19. In one or more embodiments, a fully-adhered roofing systems of the present invention can be described with reference to FIG. 2. Roofing system 40 includes a roof deck 51, optional insulation layer 53, optional protection layer 55, optional existing membrane 57, adhesive layer 60, and membrane 71, where membrane 71 is a membrane according to one or more embodiments of the present invention. For purposes of this specification, the material to which the adhesive secures the membrane, which is the uppermost layer, can be referred to as the substrate. For example, where the membrane is adhesively secured to an insulation board or layer, the insulation board or layer may be referred to as a substrate.

Practice of this invention is not limited by the selection of any particular roof deck. Accordingly, the roofing systems herein can include a variety of roof decks. Exemplary roof decks include concrete pads, steel decks, wood beams, and foamed concrete decks.

In one or more embodiments, the existing membranes may include cured rubber systems such as EPDM membranes, thermoplastic polymers systems such as TPO membranes, or asphalt-based systems such as modified asphalt membranes and/or built roof systems.

Practice of this invention is likewise not limited by the selection of any particular insulation board. Moreover, the insulation boards are optional. Several insulation materials can be employed including polyurethane or polyisocyanurate cellular materials. These boards are known as described in U.S. Pat. Nos. 6,117,375, 6,044,604, 5,891,563, 5,573,092, U.S. Publication Nos. 2004/0109983, 2003/0082365, 2003/0153656, 2003/0032351, and 2002/0013379, as well as U.S. Ser. Nos. 10/640,895, 10/925,654, and 10/632,343, which are incorporated herein by reference. As those skilled in the art appreciate, insulation boards and cover boards may carry a variety of facer materials including, but not limited to, paper facers, fiberglass-reinforced paper facers, fiberglass facers, coated fiberglass facers, metal facers such as aluminum facers, and solid facers such as wood.

In one or more embodiments, cover boards may include high density polyurethane or polyisocyanurate board as disclosed in U.S. Publ. Nos. 2006/0127664, 2013/0164524, 2014/0011008, 2013/0036694, and 2012/0167510 which are incorporated herein by reference. In other embodiments, the cover boards may include construction boards such as DensDeck.

In other embodiments, these membranes may be employed to cover flat or low-slope roofs following a re-roofing event. In one or more embodiments, the membranes may be employed for re-roofing as described in U.S. Publication No. 2006/0179749, which is incorporated herein by reference.

Practice of the present invention is also not necessarily limited by the adhesive employed to bond the membrane to the substrate. For example, the adhesive may include an adhesive that forms a bond through curing action such as is the case with a liquid bond adhesive (e.g. a butyl rubber adhesive) or a polyurethane adhesive. In other embodiments, the adhesive may be a pressure-sensitive adhesive, which may be applied to the membrane at the location where the membrane is manufactured (e.g. a factory-applied pressure-sensitive adhesive).

As used within the specification, the term "fully-adhered roofing system" refers to a roofing system wherein the primary mode of attachment of the membrane to the underlying substrate is through the use of an adhesive. In one or more embodiments, this mode of attachment includes the situation where at least 50%, in other embodiments at least 70%, in other embodiments at least 90%, and in other embodiments at least 98% of the underlying surface of the membrane (i.e. the substrate-contacting planar surface of the membrane) is adhered to the substrate through an adhesive.

Various modifications and alterations that do not depart from the scope and spirit of this invention will become apparent to those skilled in the art. This invention is not to be duly limited to the illustrative embodiments set forth herein.

What is claimed is:

1. A multi-layered membrane comprising:
   (i) skin layers, where each skin layer includes from about 40 to about 85 percent by weight ethylene-based olefinic block copolymer, based on the total weight of the thermoplastic component of the respective skin layers, and at least 33% by weight filler based on the total weight of the respective skin layers; and
   (ii) two or more core layers, where each core layer includes greater than 24% by weight propylene-based elastomer, based on the polymeric content of the respective core layers, and at least 20% by weight filler based on the total weight of the respective core layers.

2. The multi-layered membrane of claim 1, where the membrane includes:
   (i) a top layer including from about 40 to about 85 percent by weight ethylene-based olefinic block copolymer, based on the total weight of the thermoplastic component of the top layer, and greater than 33% by weight magnesium hydroxide based upon the total weight of the top layer;
   (ii) an upper-middle layer including greater than 24% by weight propylene-based elastomer, based on the polymeric content of the upper-middle layer, and greater than 25% by weight calcium carbonate based upon the total weight of the upper-middle layer;
   (iii) a lower-middle layer including greater than 24% by weight propylene-based elastomer, based on the polymeric content of the lower-middle layer, and greater than 25% by weight calcium carbonate based upon the total weight of the lower-middle layer; and
   (iv) a bottom layer including from about 40 to about 85 percent by weight ethylene-based olefinic block copolymer, based on the thermoplastic content of the bottom layer, and greater than 33 by weight calcium carbonate based upon the total weight of the bottom layer, where said top layer and bottom layer form said skin layers, and said upper-middle layer and lower-middle layer form said core layers.

3. The multi-layered membrane of claim 1, where the skin layers include greater than 60 weight percent ethylene-based olefinic block copolymer based on the total weight of the thermoplastic component of the respective skin layers.

4. The multi-layered membrane of claim 2, where the core layers include greater than 30% by weight calcium carbonate based upon the total weight of the respective core layers.

5. The multi-layered membrane of claim 4, where the core layers include calcium carbonate and magnesium hydroxide.

6. The multi-layered membrane of claim 2, where the top layer and the upper-middle layer are coextruded, where the bottom layer and the lower-middle layer are coextruded, and where the upper-middle layer is laminated to the lower-middle layer with a fabric sandwiched therebetween.

7. The multi-layered membrane of claim 1, where the thickness of the membrane is from about 45 to about 75 mil.

8. The multi-layered membrane of claim 2, where the top layer accounts for about 15 to about 45%, where the bottom layer accounts for about 15 to about 45%, where the upper middle layer accounts for about 15 to about 45%, and where the lower middle layer accounts for about 15 to about 45% of the overall thickness of the membrane.

9. The multi-layered membrane of claim 1, where the propylene-based elastomer is characterized by a melting point that is less than 110° C. and a heat of fusion of less than 75 J/g.

10. The multi-layered membrane of claim 1, where the multi-layered membrane satisfies the standards of ASTM D-6878-03.

11. The multi-layered membrane of claim 2, where the ethylene-based olefinic block copolymer includes a first plurality of ethylene-$\alpha$-olefin blocks having a first $\alpha$-olefin content, and a second plurality of ethylene-$\alpha$-olefin blocks having a second $\alpha$-olefin content, where the first $\alpha$-olefin content is greater than the second $\alpha$-olefin content.

12. A roof system where the membrane of claim 1 is adhered to a roof substrate.

13. A method of making the roofing membranes of claim 2, the method comprising:
   (i) forming a first co-extrudate by co-extruding a first composition including an ethylene-based olefinic copolymer and a propylene-based elastomer and a second composition including a propylene-based elastomer;
   (ii) forming a second co-extrudate by co-extruding a third composition including a propylene-based elastomer and a fourth composition including an ethylene-based olefinic copolymer and a propylene-based elastomer; and
   (iii) laminating the first co-extrudate to the second co-extrudate.

14. The multi-layered membrane of claim 2, where the membranes have a storage modulus, as determined by DMA, in the machine direction at −20° C. of less than 850 MPa.

15. The multi-layered membrane of claim 14, where the membranes have a flexural modulus, as determined by ASTM D790, of less than 150 MPa.

16. The multi-layered membrane of claim 15, where the membranes have a Shore D hardness, as determined by ASTM D2240, of less than 40.

17. The multi-layered membrane of claim 16, where the membranes have a normalized Taber stiffness, in the machine direction, of less than 15.

18. The multi-layered membrane of claim 17, where the membranes have a normalized Taber stiffness, in either the machine or cross-machine direction, of from about 1 to about 12.

19. The multi-layered membrane of claim 18, where the membranes have Taber stiffness values of the membranes of the present invention are at least 50% lower than comparative membranes prepared using propylene-based thermoplastic polyolefins such as reactor copolymers.

\* \* \* \* \*